(12) United States Patent
Ayyagari et al.

(10) Patent No.: US 7,835,285 B2
(45) Date of Patent: Nov. 16, 2010

(54) QUALITY OF SERVICE, POLICY ENHANCED HIERARCHICAL DISRUPTION TOLERANT NETWORKING SYSTEM AND METHOD

(75) Inventors: Arun Ayyagari, Seattle, WA (US); Michael A. Dorsett, Federal Way, WA (US); Michael S. Foster, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 12/025,451

(22) Filed: Feb. 4, 2008

(65) Prior Publication Data

US 2009/0196170 A1 Aug. 6, 2009

(51) Int. Cl.
*H04L 12/26* (2006.01)
(52) U.S. Cl. ............ 370/236; 370/368; 370/401; 370/413; 370/419; 370/429; 709/224; 709/234; 713/151; 714/748
(58) Field of Classification Search ............ 370/236, 370/229, 328, 428–429, 216, 230–234, 235, 370/363, 368, 401, 412–418; 709/239, 242, 709/230–234, 224, 225, 226; 713/151; 714/748; 398/96, 118
See application file for complete search history.

(56) References Cited

U.S. PATENT DOCUMENTS 6,011,779 A * 1/2000 Wills .................... 370/236

| 7,613,828 | B2 * | 11/2009 | Zintel et al. ............ 709/239 |
| 7,630,305 | B2 * | 12/2009 | Samuels et al. ......... 370/229 |
| 2001/0021984 | A1 * | 9/2001 | Kim .................... 714/18 |
| 2005/0068974 | A1 * | 3/2005 | Barker et al. ........... 370/235 |
| 2005/0216726 | A1 * | 9/2005 | Dellmo et al. .......... 713/151 |
| 2007/0291689 | A1 * | 12/2007 | Kapur et al. ........... 370/328 |
| 2008/0089333 | A1 * | 4/2008 | Kozat et al. ........... 370/412 |
| 2008/0244089 | A1 * | 10/2008 | Yarvis et al. ........... 709/242 |
| 2009/0129316 | A1 * | 5/2009 | Ramanathan et al. ..... 370/328 |

OTHER PUBLICATIONS

Burleigh, S.; Hooke, A.; Torgerson, L.; Fall, K.; Cerf, V.; Durst, B.; Scott, K.; Weiss, H., "Delay-tolerant networking: an approach to interplanetary Internet," Communications Magazine, IEEE , vol. 41, No. 6, pp. 128-136, Jun. 2003.*

(Continued)

*Primary Examiner*—Kwang B Yao
*Assistant Examiner*—Jeffrey M Rutkowski
(74) *Attorney, Agent, or Firm*—Harness, Dickey & Pierce, P.L.C.

(57) ABSTRACT

According to an embodiment, a method includes a Delay Tolerant Network (DTN) software overlay residing in a first plane of a node of the network is used to define hierarchical forwarding behavior for data being generated in the first plane. In a second plane of the network, local buffering and data retransmission is performed in response to at least one intermittent network outage. Communication between the first and second planes is performed to manage the transmission of data between the first and second planes as needed in the event of at network outage that is longer in duration than the at least one intermittent network outage, to thus prevent the loss of data.

21 Claims, 2 Drawing Sheets

OTHER PUBLICATIONS

Elgan Huang, Wenjun Hu, Jon Crowcroft, and Ian Wassell. 2005. Towards commercial mobile ad hoc network applications: a radio dispatch system. In Proceedings of the 6th ACM international symposium on Mobile ad hoc networking and computing (MobiHoc '05). ACM, New York, NY, USA, 355-365.*

Kevin Fall. 2003. A delay-tolerant network architecture for challenged internets. In Proceedings of the 2003 conference on Applications, technologies, architectures, and protocols for computer communications (SIGCOMM'03). ACM, New York, NY, USA, 27-34.*

* cited by examiner

QUALITY OF SERVICE, POLICY ENHANCED HIERARCHICAL DISRUPTION TOLERANT NETWORKING SYSTEM AND METHOD

FIELD

The present disclosure relates to networks, and more particularly to a system and methodology for providing a quality of service policy enhanced hierarchical disruption tolerant network that is especially well suited to ensuring end-to-end data transmissions across high speed networks/links, even under conditions of intermittent outages.

BACKGROUND

The statements in this section merely provide background information related to the present disclosure and may not constitute prior art.

Existing Delay Tolerant Networking (DTN) software overlay functions operate in the user mode space of a computing operating system (OS) and are suitable for moderate speed networks, typically on the order of 10 s of Mb/s. The DTN framework and protocol provides reliable end-to-end communications in the face of network partitioning or intermittent disruption, for example when a contemporaneous end-to-end path between a source and a destination does not exist. Traditional Internet protocols do not handle these situations well at the application, transport or network layers, resulting in either extremely low throughput or a complete inability to move data. DTN provides custody-based reliability for end-to-end communications among heterogeneous environments via an application layer overlay network that can run on top of an Internet protocol or other protocols. However, since DTN operates as a software overlay networking layer in the user mode space of the OS, it will not fully serve the disruption mitigation requirements of high speed network systems.

Furthermore, invoking DTN, since it is a software overlay function, requires it to operate in the red (i.e., plain-text) side of a cryptographically partitioned network. This is necessary to allow the DTN daemon to perform the custodial transfer of DTN bundles on a hop-by-hop basis from one node to another along the DTN route. High speed link outages, even for short durations (e.g., milliseconds), can result in significant loss of data. The significant loss of data can potentially cause upper layer transport protocols such as TCP/IP to "back-off". By "back-off", it will be understood that TCP/IP utilizes a congestion control mechanism to ensure that the source does not transmit TCP/IP packets at a rate beyond what can be sustained on an end-to-end basis. Therefore, source node TCP/IP slowly ramps up the packet transmission rate up to the limit that can be sustained on an end-to-end basis. Source TCP/IP determines the limit based on the timely receipt of the acknowledgement for transmitted packets from the destination node. However, the TCP/IP protocol cannot discern between congestion and loss of packets. Thus, any loss of packets is interpreted as congestion in the network. When the source node TCP/IP does not receive acknowledgements for transmitted packets from the destination node it immediately ramps down the TCP/IP packet transmission rate by half. So the congestion control mechanism of TCP/IP ramps up the rate in single steps up to the objective rate, but when it assumes that the network is congested (which could in fact also be due to packet losses), it will reduce the current transmission rate by 50%. This saw tooth behavior of source node TCP/IP is what is known as "backoff".

One can see that even a minor disruption resulting in packet loss will cause the source node TCP/IP to backoff resulting in poor network utilization. The process by which the source node TCP/IP slowly ramps up the transmission rate is enabled by what is known as a "slow start" algorithm. When the source node TCP/IP presumes congestions, which could be due to packet loss, it will go into slow start mode resulting in poor network utilization (even with a small packet loss.), causing overall network utilization to significantly deteriorate and adversely impacting the overall completion rates for end-to-end data transmissions.

Quality of Service (QoS) provisioning can be used for data classification on the red side of a node. However, assigning preferential forwarding behavior for data generated by DTN enabled applications, and being transmitted on the black (i.e., cipher-text) high speed side of the node, is difficult to ensure. This is because following the encryption of the packets from various applications on the red (plain-text) side, one cannot discern the red side source or destination applications from the packets on the black (cipher-text) side. This is particularly so when the network is suffering from intermittent link outages.

SUMMARY

According to one embodiment, a method includes using a Delay Tolerant Network (DTN) software overlay in a first plane of a network to define hierarchical forwarding behavior for data being generated; in a second plane of the network, performing local buffering and data retransmission in response to at least one intermittent network outage; and communicating between the first and second planes to manage the transmission of data between the first and second planes as needed in the event of a network outage that is longer in duration than the at least one intermittent network outage.

According to another embodiment, a method includes using a Delay Tolerant Network (DTN) software overlay in a first plane of a network to define hierarchical forwarding behavior for data being generated by a plurality of different applications at a first node of the network, and at a first speed; communicating information to and from the first plane using a first router; using a second router in a second plane of the network to communicate information from the first router to a second node at a second speed, and performing local buffering and data retransmission in response to at least one intermittent network outage affecting the network; and using the second router to communicate to the first router to manage the communication of data between the first and second planes as needed to prevent a loss of said data, in the event of a network outage that is longer in duration than said at least one intermittent network outage.

Accordingly to yet another embodiment, a Quality of Service (QoS), hierarchical, disruption tolerant network is disclosed that includes a Delay Tolerant Network (DTN) software overlay in a first plane of the network that defines a hierarchical forwarding behavior for data being generated by a plurality of different applications at a first node of the network; a second plane of the network including a second router to communicate information from said first router to a second node at a second speed, and performing local buffering and data retransmission in response to at least one intermittent network outage affecting said network; and the second router configured to communicate with the first router as needed to manage the transmission of data from the first node to a second node as needed to prevent a loss of said data when a network outage occurs, and where the network outage is longer in duration than the at least one intermittent network outage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
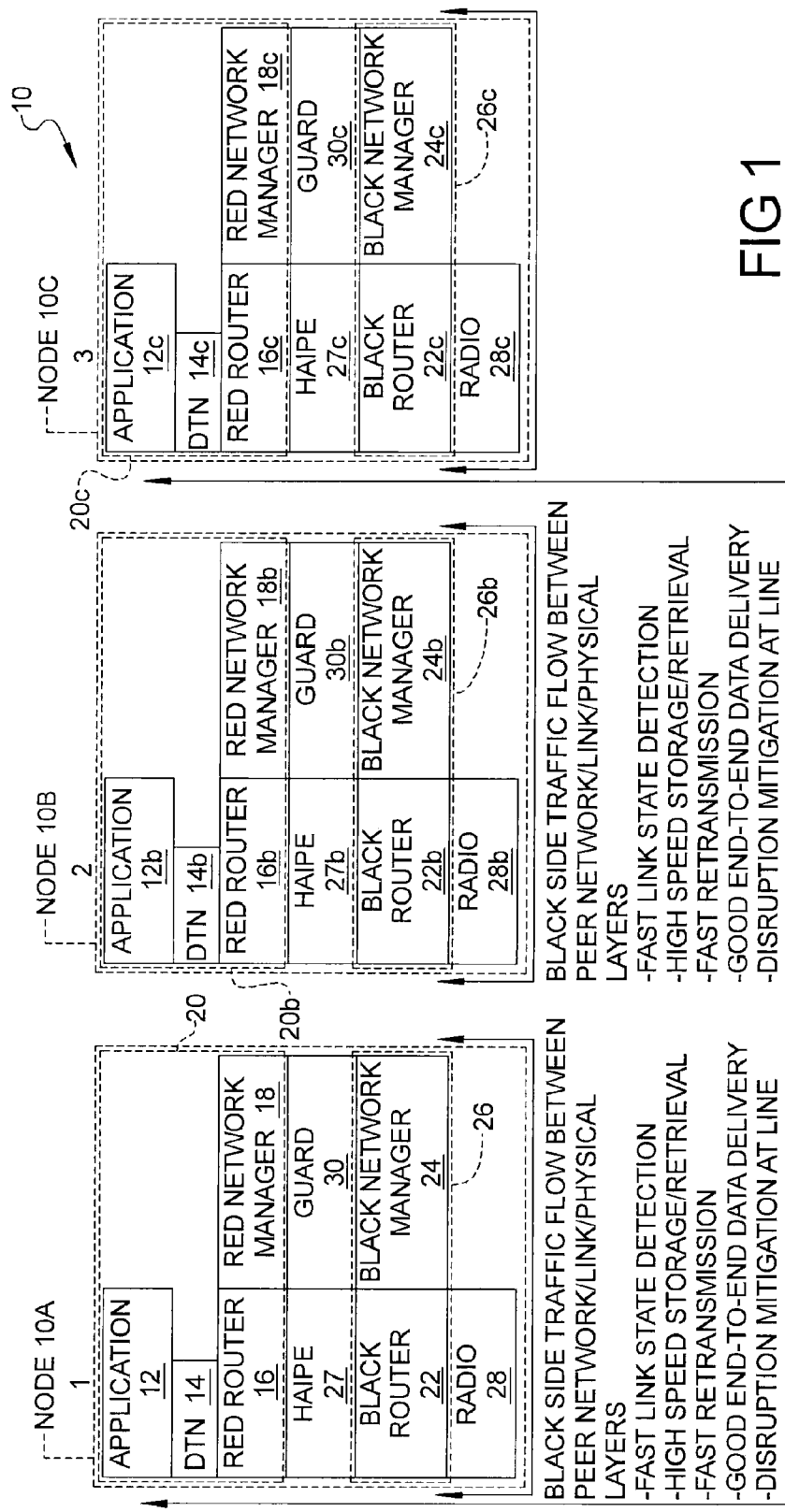
FIG. 1 is a diagram of an exemplary embodiment of a network that has three nodes in accordance with an embodiment.

Referring to FIG. 1, a diagram of an exemplary embodiment of a network that has three nodes in accordance with an embodiment, one exemplary implementation of a Quality of Service (QoS), hierarchical, delay tolerant network (DTN) 10 is shown. For convenience, the term "network 10" will be used to refer to the network illustrated in FIG. 1. The network 10 forms a multihop network that in this example includes three nodes 10a, 10b and 10c. However, it will be appreciated that the teachings described herein could be implemented on a network with only two nodes, or a network with more than three nodes.

The nodes 10a, 10b and 10c, in this example, are of functionally similar construction, so the specific construction of only node 10a will be provided. However, it will be appreciated that the nodes 10a, 10b and 10c need not be perfectly identically constructed. Node 10a typically includes one or more processors configured to fetch, decode, and execute a plurality of applications 12 that are operating and generating data packets that need to be routed to other nodes. Some of these applications are of higher importance than others, and a hierarchy may be assigned to each application depending on its importance. For example, if five applications are running, application 1 may be the most important, and may be designated as such. In this manner, as network outages are experienced, the network 10 will give priority to forwarding data generated by application 1. This will be described in greater detail in the following paragraphs.

A delay tolerant network (DTN), software overlay (hereinafter "DTN") 14 is associated with the group of applications 12 at each node 10a, 10b and 10c. The DTN 14 is essentially a software overlay that provides reliable end-to-end communications in the face of network partitioning or disruption, i.e., when a contemporaneous end-to-end path between source and destination is not available. DTN 14 also provides custody-based reliability for end-to-end communications among heterogeneous environments because it operates as an overlay layer that runs on top of Internet or other protocols. The DTN 14 enables a hierarchy to be set for the various applications 12 so that they can be prioritized as to importance.

A first or "red" router 16 includes an associated "red" network manager 18. The red router 16 is also associated with DTN software overlay 14. Since the DTN software overlay 14 operates in the user mode space of the operating system (OS), it operates at a first, slower speed as compared to red router 16 hardware implementation. The red network manager 18 communicates control signaling messages to the red router 16 that enables the red router to adjust rate of transmission (e.g., to stop transmission) of the application data 12 sent directly to the red router 16 in the event of a longer duration network outage. Similarly, the network manger 18 communicates control and signaling messages to the DTN software overlay 14 that enables the DTN software overlay 14 to start buffering application data 12 sent directly to DTN software overlay 14 in the event of a longer duration network outage. In this example, the network 10 forms a cryptographically partitioned network having a plain-text side and cipher-text side. The application 12, DTN software overlay 14, red router 16, and red network manager 18 operate in a first (or red) plane 20 (also termed "red side") that forms the plain-text side of the cryptographically partitioned network. By "short term" network outage, it is meant outages/disruptions in the order of seconds or less, for example up to 5 to 10 seconds. An example of this might be when an airborne platform traverses though a cloud and rain burst resulting in hybrid link outage or the airborne platform maneuvers resulting in blanking due to wing or tail obstruction leading to link outage. By "long term" it is meant outages greater than what is stated for "short term". An example of this would be when the airborne platform goes through extensive turbulent conditions or when there is physical obstructions requiring repositioning which would result in link outages beyond the "short term" limits.

The node 10a also includes a second or "black" router 22 that operates at a second speed that is significantly higher than the first speed (often about 100 s of Mb/s to multiple to 10 s of Gb/s network transmission rates). Thus, the black router 22 can be viewed as a "high speed", high bandwidth router that provides a high end-to-end data delivery guarantee, and is well suited to high speed data retransmission in the event of intermittent, short duration communication disruptions between nodes within the network 10. The black router 22 also includes an internal buffer that can buffer data received from the red router 16 during intermittent network outages, to thus prevent data from being lost. A second or "black" network manager 24 is in communication with the black router 22 and transmits messages from the black router 22 to the red network manager 18. For example, if the black router 22 is buffering data received from the upstream red router 16 while a long duration network outage is taking place, and a predetermined buffer capacity of the black router 22 is reached, the black router 22 may send a message to the black network manager 24 to inform the red router 16 to stop sending data. This function will be described more fully in an example provided in the following paragraphs. The black router 22 and the black network manager 24 form a second or "black" plane (or "black side") 26, also known as the "cipher-text" side of the cryptographically partitioned network 10. A radio 28 wirelessly transmits the data from the black router 22 to the black routers of other nodes 10b and 10c. However, it will be appreciated that the network 10 could be implemented using wired or free space optical (FSO) connections between the nodes 10a, 10b and 10c as well. Black side traffic flow between peer network/link/physical layers of the nodes 10a, 10b and 10c provides fast link state detection, high speed storage/retrieval, fast retransmission, good end-to-end delivery and disruption mitigation at line speeds. Red side end-to-end traffic flow between the nodes 10a, 10b and 10c provides the DTN software overlay 14 that provides custodial data transfer, and guaranteed end-to-end data delivery.

Each node 10a, 10b and 10c further preferably includes a High Assurance Internet Protocol Encryption (HAIPE) subsystem 27 interposed between the red router 16 and the black router 22. The U.S. Department of Defense (DoD) policies require the use of High Assurance Internet Protocol Encryptor (HAIPE) devices that provide cryptographic isolation between data in red security enclaves and data that is transported across a black shared transit network through HAIPE tunnels, i.e., IP Security (IPSec) tunnel mode with Encapsulating Security Payload (ESP). As a result, packet exchanges and even IP addresses visible in the Red enclaves are opaque to the Black network.

A guard subsystem 30 is also interposed between the red network manager 18 and the black network manager 24 to insure authenticity of communications from the black network manager 24 to the red network manager 18. More particularly, the black (cipher-text) plane could have intrusions (unauthorized communications) sourced from the black (cipher-text) plane. However such unauthorized communications will be is prevented from the red (plain-text) plane. The guard subsystem 30 also ensures that only certain pre-defined and permitted data sourced from the black plane is allowed to be passed back up to the peer red plane within a given node. Data sourced from the black plane conforms to limited exceptions such that certain black plane network performance or control signaling information is allowed to be bypassed from the black plane to the red plane within a given node in a controlled manner. The guard subsystem 30 essentially monitors the information flow from the black side network manager 24 to the red side network manager 18 and only allows a predetermined set of messages to be passed for network security reasons.

It will be appreciated then, that disruption tolerance control is provided at multiple layers within each node 10a, 10b and 10c of the network 10. The black router 22 provides hardware assisted data packet storage (i.e., buffering) and fast data retransmission at the underlying network/link/physical layer. In effect, the black router 22 performs data traffic shaping and policing at the router level within each node 10a, 10b and 10c. The black router 22 mitigates or eliminates the loss of data that is being transmitted between the network/link/physical layers of the network of the network at line speeds, when short duration, intermittent network outages occur. Such short duration network outages may be caused, for example in a free space optical system, by short duration fades, while longer term outages may be caused by clouds.

The cooperative functioning of the DTN 14, the red router 16, red network manager 18, black router 22 and black network manager 24 forms a second layer of disruption tolerance control. This second layer operates as a "back pressure" managing mechanism to cause longer term data storage by the red routers 16 along a particular traffic flow path that makes use of a DTN software overlay function. By "back pressure", it is meant how quickly and freely data is being transmitted by the black routers 22 at the nodes of a given data flow path. Increasing back pressure means that upstream routers are filling their buffers (in response to short term outages) and that data throughput on a given data flow path is dropping. Decreasing back pressure means that available buffer capacity of the black routers 22 is increasing and that data throughput on a given data flow path is increasing.

The second layer described above thus addresses the problem of handling data packet storage and the custodial transmission of data between the nodes that form a particular data traffic flow path that make use of the software overlay functionality of the DTN 14 (i.e., above the red routers 16) during longer duration network outages. This arrangement of the two layers can be viewed as forming a "cross layer" design that allows preferential (i.e., hierarchical) data forwarding behavior to be programmed into the red routers 16, and translated into black plane (i.e., second plane 26) preferential storage and forwarding behavior via the black routers 22. The cross layer design thus allows for disruption mitigation functionality to be implemented at the underlying network/link/physical layers, which minimizes the need for DTN software overlay functionality that is primarily at the red side of the source and destination nodes of the traffic flow path (i.e., to the red routers 16 at the source and destination sides of the traffic flow path). This eliminates the need for data traffic flow to go up and down intermediary nodes along the traffic flow path to a user mode space. This allows for greater network utilization while minimizing the user mode processing requirements at intermediary nodes. This is further true because in most instances of network outages that are short term in duration, the traffic flow will not need to invoke the DTN 14 software overlay functionality above the red routers 16.

Examples will now be provided as to how the hierarchical, delay tolerant network 10 of the present disclosure may operate in various scenarios. In this example the Applications 12 on Node 10a are communicating with applications on Node 10c. The components of node 10b in common with those of node 10a have been designated with a "b" suffix, while the common components of node 10c have been designated with a "c" suffix to aid in the description of the data flows between the various components of the nodes.

Data flow initially occurs from the node 10a applications 12 to the DTN 14, to the Red Router 16, to the HAIPE subsystem 27, to the Black Router 22, and to the Radio 28. The radio 28 transmits the information to the node 10b Radio 28b. The radio 28b forwards the information to the Black Router 22b, which then forwards it back to the radio 28b. Radio 28b then transmits the information to the radio 28c of node 10c. The information then passes from the radio 28c to the black router 22c, then to the HAIPE subsystem 27c, then to the red router 16c, and then to the applications 12c.

Data flow that utilizes only the black router plane (cipher-text side) will flow as follows. Data from the node 10a applications 12 will be passed to the red router 16, then to the HAIPE subsystem 27, then to the black router 22, then to radio 28. Radio 28 will transmit the information to the radio 28b of node 10b. From there the information will be passed to the black router 22b, and then back to the radio 28b. Radio 28b will transmit the information back to the node 10c radio 28c, where it will then be passed to the black router 22c, then to the HAIPE subsystem 27c and then to the red router 16c.

When link connectivity between the node 10b radio 28b and the node 10c radio 28c is disrupted, the information flow will be as follows. The node 10b black router 22b detects the loss of acknowledgement packets from the node 10c black router 22c to the packet previously sent from the black router 22b. The assumption here is that the black router 22b establishes synchronous connectivity with black router 22c by sending either dummy/idle or valid packets to the black router 22c, which acknowledges the receipt of these packets by sending an acknowledgement back to the black router 22b. So when the link between node 10b and node 10c is disrupted, the black router 22b will not receive the acknowledgements for packets that it has transmitted and will conclude that connectivity between node 10b and node 10c has been disrupted. At this point the black router 22b will continue to source dummy/idle packets but will start to buffer valid packets. If the node 10b black router 22b starts to see acknowledgements from the node 10c black router 22c for the dummy/idle packets it previously transmitted, it will start to transmit the buffered valid packets. However, if the connectivity between node 10b and node 10c is disrupted, the black router 22b will continue to buffer valid packets up to its defined buffer memory usage threshold value. Once this buffer memory usage threshold value is reached, the black router 22b will signal to the upstream black router 22 (i.e., at node 10a) to start buffering valid packets associated with the particular session (e.g., source/destination tuple space or virtual private tunnel (VPN)) between the node 10a red router 16 and the node 10c red router 16c. This will cause the node 10a black router 22 to start buffering the packets associated with the particular VPN session. If the node 10b black router 22b starts to see acknowledgements from the node 10c black router 22c for dummy/idle packets transmitted, it will start to transmit the buffered valid packet and will signal to the upstream black router 22 (i.e., at node 10a) to start transmitting the buffered valid packets.

If connectivity between node 10b and node 10c continues to be disrupted and the node 10a black router 22 buffer memory usage reaches a defined threshold, being the most upstream black router for the particular VPN session, it will signal the DTN 14 within node 10a to start buffering. In this case the node 10a black router 22 will signal the node 10a DTN 14 as follows. The node 10a black network manager 26 will transmit a message to the guard subsystem 30, which will be forwarded to the red network manager 18, then to the red router 16, and then to the DTN 14. On receiving the signal to start buffering, the node 10a DTN 14, based on a previously set policy definition, will start to buffer at the node 10a DTN 14 only those node 10a applications 12 as indicated by the policy. The node 10a red network manager 18, per the policy, may instruct the other network-aware node 10a applications 12 to back-off or stop sourcing information due to non-availability of the end-to-end connectivity between the node 10a applications 12 and peer node 10c applications 12c. Once the node 10b black router 22b starts to see acknowledgements from the node 10c black router 22c for the dummy/idle packets it (the black router 22b) has transmitted, it will start to transmit the buffered valid packets. It will also signal the upstream black router 22 to start transmitting the buffered valid packets. On receiving this signal the node 10a black router 22 will start transmitting the buffered valid packets and will also signal the node 10a DTN 14 to start transmitting the buffered valid packets via a message passed to the black network manager 24, to the guard subsystem 30, then to the red network manager 18, then to the red router 16, and then to the DTN 14.

The above described process allows for faster hardware based disruption tolerant networking processes at each black router 22, 22b and 22c, though with limited buffer memory, while using the slower software based (but with much larger buffer memory) at the red plane DTN 14. This combined approach allows for better scaling and effective disruption tolerant networking in a distributed manner. Even buffer memory usage is distributed in up stream black routers 22 and 22b via a simple backpressure mechanism implemented via signaling messages between peer black routers. This arrangement is especially advantageous because, as explained above, the black routers cannot discern between information across applications 12 and 12c. This inability to discern from where the information originated is because the HAIPE subsystem 27 implements tunnel mode IPSec (IP in IP encapsulation) whereby all packets have the same black router source and destination addresses and the payload is completely encrypted.

With regard to backpressure, for example, if a given flow is provisioned with 10 units of buffer storage capacity, the high threshold value may be set to 8 and the low threshold value may be assigned a value of 6. Note that the high and low threshold values are a function of the flow bandwidth requirements and the amount of signaling time required for the particular black router to signal the immediate upstream black router to start buffering packet associated with the particular flow and thereby stop forwarding packet associated with the given flow. The difference between the low-threshold value and high-threshold value is based on the backpressure signaling period to the immediate upstream node black router and more importantly to provide a hystersis to prevent repeated backpressure signaling in quick succession, i.e., introduces lag to allow for steady state operational behavior.

Figure 2:
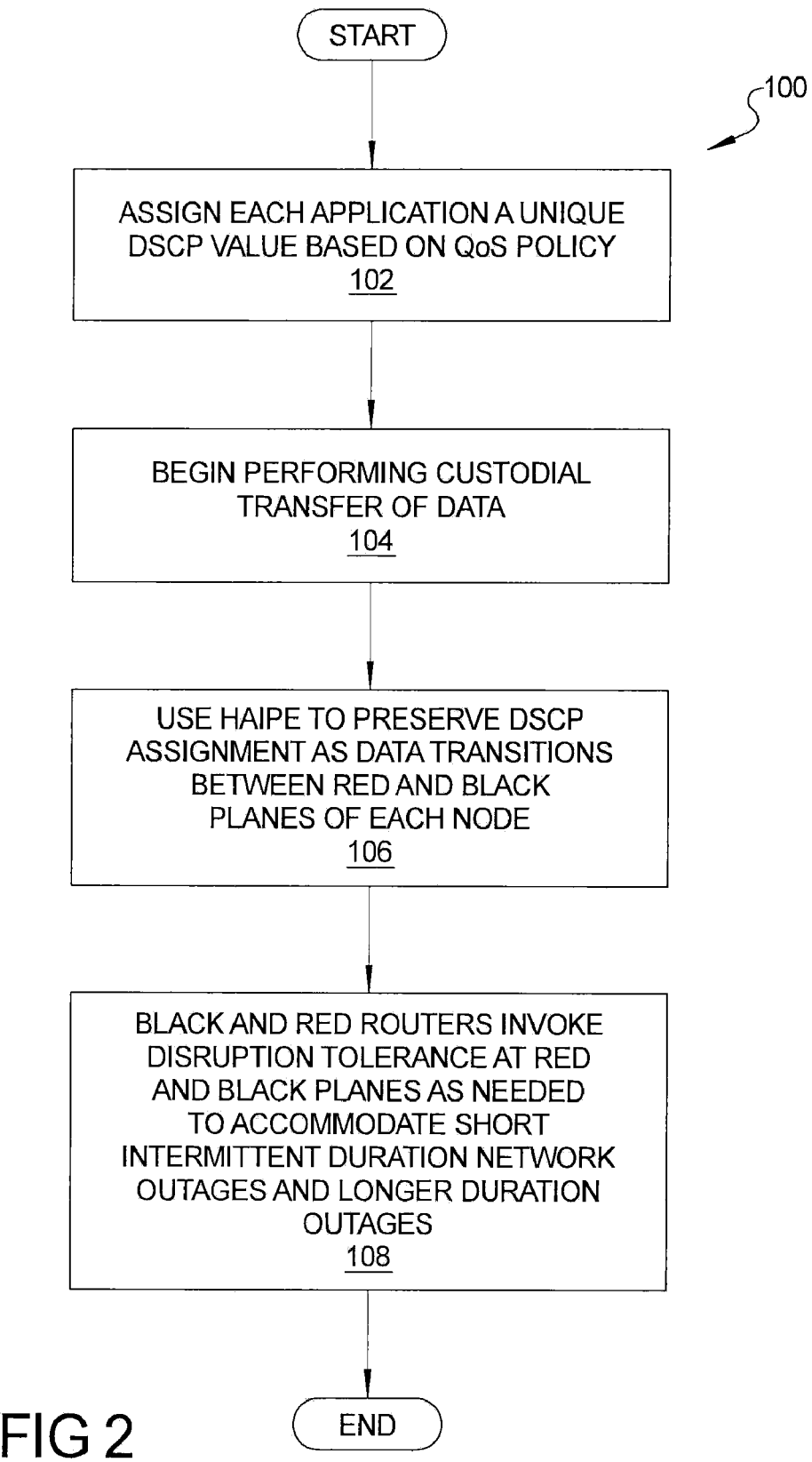
FIG. 2 is a flowchart of major operations performed in accordance with an embodiment.

Referring to the flowchart 100 of FIG. 2, a high level summary of the overall operation of the network 10 will be provided. In operation of the network 10, an application traffic flow, per a predetermined QoS policy, is initially assigned to a given Traffic Class (IPv6) or Type of Service (ToS) assignment per Differentiated Services (DiffServ) Code Points (DSCP). Thus, each application of the applications 12 shown in FIG. 1 is assigned a particular DSCP value based on the QoS policy being used, as indicated at operation 102.

Per the QoS policy, and thereby per the DSCP assignment and other QoS classifier tuple space, the applications 12 may invoke end-to-end data transmission via either the DTN software overlay 14 or directly via standard BSD Sockets, via TCP/IP or UDP/IP sessions, to the red router 16. In this example, tuple space means the group of classifiers used to denote a particular flow that is uniquely identified by one or more of the five-tuple space consisting of, source IP address, destination IP address, source port, destination port, and protocol ID.

It is the DTN software overlay 14 that performs the custodial transfer of data. Nevertheless, it is possible for one to host the DTN software overlay functions within the red router in which case one can actually call the red router a DTN software enabled red router. The DTN software overlay 14 performs custodial transfer of data with storage and forwarding/retransmission functions between peer DTN level hops (i.e., between DTN 14 of node 10a and the DTN 14b of node 10b; and between the DTN 14b of node 10b and the DTN 14c of node 10c, as shown in FIG. 1), as indicated at operation 104.

The QoS policy ensures that the applications with extremely critical data that require guaranteed end-to-end delivery are assigned to the DTN 14 layer. Also note that the QoS policy ensures that the aggregate data transmission, i.e., the number of applications assigned to the particular QoS classifier, to be processed by the DTN 14 is limited within the storage and processing bounds of the user mode daemon. Put differently, based on the computing processing capability, i.e., processor capability, and the long term storage capability (i.e., hard disk drive (HDD) capacity), the QoS policy limits the assignment of applications 12 to the DTN 14 so as to be within the defined computing and storage resource limits of the DTN 14.

The HAIPE subsystem 27 functions to preserve the DSCP assignment as data traffic transitions from the red plane 20 to the black plane 26 (i.e., to the Network/Link/Physical Layer) at each node 10a, 10b and 10c, and as the data transitions from a black side (i.e., plane 26) IP packet header to a red side (i.e., plane 20) IP packet header, at each node, as indicated at operation 106.

The traffic controller on the black plane 26 of a given Network/Link/Physical layer, per the assigned QoS policy, consists of the DSCP value and any other QoS classifier tuple space (e.g., a source/destination IP address) performs packet classification, marking, and transmission scheduling to ensure that traffic flow is metered to a desired shape and rate.

Per the QoS policy, and thereby the DSCP and any other QoS classifier tuple space, the data traffic flows may invoke disruption tolerant storage and forwarding/retransmission hardware assist at the black plane 26. This ensures that storage and forwarding/retransmission operations are performed for data traffic flows that are critical and require good end-to-end delivery guarantees. Data storage and forwarding/retransmission functions between peer black plane 26 hops is then performed (i.e., between Network/Link/Physical layer such as the black router 22/radio 26 of node 10*a* and the black router/radio of Node 10*b*; and between the black router/radio of node 10*b* and the black router/radio of node 10*c*), as indicated at operation 108.

Per the QoS policy, it is expected that extremely critical data being forwarded by the DTN 14 from the red plane 20 user mode space will also be directed to invoke the Network/Link/Physical layer disruption mitigation function in the black plane 26, to thus enhance end-to-end data transmission completion rate (i.e., reliability) and availability of the data at a different node. However, it should be noted while it is not mandatory that data traffic flows invoking the DTN 14 functionality also invoke the Network/Link/Physical layer disruption mitigation afforded by the black routers 22 in the black planes 26, that for optimal operation, the QoS policy will ideally require data traffic flows to make use of the disruption mitigation capabilities provided at both the red plane 20 and the black plane 26.

Traffic flows that do not require highly stringent end-to-end delivery guarantees, such as that required for extremely critical data requiring a high degree of end-to-end delivery guarantees, need not be assigned to DTN software overlay forwarding. Instead, such non-critical data traffic can be assigned (per a policy) only to the disruption mitigation forwarding implemented at the black planes 26, 26*b*,26*c* of the nodes 10*a*, 10*b* and 10*c* using the black routers 22, 22*b* and 22*c*. Thus, the disruption mitigation provided via Network/Link/Physical layer storage and forwarding/retransmission functionality (i.e., via the black routers 22, 22*b* and 22*c*) need not necessarily be coupled to the red side disruption mitigation functioning provided by the DTN 14 software overlay. Red side DTN software overlay based storage and forwarding/retransmission of traffic flows can be performed at the DTN bundle level independently of the disruption mitigation functionality provided at black plane of each node 10*a*, 10*b* and 10*c*.

The black plane 26 Network/Link/Physical layer disruption mitigation storage and forwarding/retransmission of data traffic flows is preferably performed using either a Network IP packet, or Link protocol data unit (PDU), or via a physical radio access layer (RAL) PDU. The black plane 26 hardware assist for storage and forwarding/retransmission functionality may rely on a sliding windows based packet retransmission mechanism that can work at either or all of the Network/Link/Physical layers of the protocol stack.

Use of Network layer disruption mitigation functionality (i.e., at the black plane 26) allows for maximal portability of the black side disruption mitigation solution since it may apply to all IP based (IPv6 or IPv4) networks with varying underlying Link/Physical layers. This implies that network layer disruption mitigation functionality may store and forward/retransmit at IP packets granularity rather than by link or physical layer packets/frames.

The various embodiments of the network described herein thus enables two distinct levels of disruption tolerance to be implemented to prevent against data loss during both intermittent, short duration network outages, as well as longer duration network outages. DTN functionality is achieved at the black plane (i.e., network/link/physical layer) of each node through the use of fast routers for data buffering and high speed data retransmission. DTN functionality is achieved at the red plane of each node via DTN software overlays that control operation of DTN controlled routers to manage data transmission and buffering during longer duration network outages.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for forming a Quality of Service (QoS) hierarchical, disruption tolerant network, comprising:

using a Delay Tolerant Network (DTN) software overlay in communication with a first router operating in a first plane of a network to define hierarchical forwarding behavior for data being generated and transmitted by the first router to a second router, where the second router is operating in a second plane of the network, with the second plane being within a network physical layer of the network;

using the second router to perform local buffering and data retransmission in response to at least one intermittent network outage without causing the DTN software overlay to invoke buffering by the first router; and communicating between the first router operating in the first plane and the second router operating in the second plane to manage the transmission of data between said first and second planes as needed in the event of a network outage that is longer in duration than said intermittent outage.

2. The method of claim 1, wherein said intermittent network outage comprises an intermittent network outage of 5 to 10 seconds, and wherein said network outage longer than said intermittent network outage comprises a time longer than 10 seconds.

3. The method of claim 1, wherein using a DTN software overlay comprises using a DTN network overlay in a plain-text plane of a cryptographically partitioned network.

4. The method of claim 3, wherein said performing local buffering and data retransmission in a second plane of the network comprises performing local buffering and data retransmission in a cipher-text plane of a cryptographically partitioned network.

5. The method of claim 4, wherein said using a DTN software overlay in a first plane of a network comprises using the first router and a first network manager in communication with the first router to assist in managing communications between said first and second planes.

6. The method of claim 5, wherein said performing local buffering and data retransmission comprises using the second router and a second network manager in communication with the second router.

7. The method of claim 1, further comprising using a High Assurance Internet Protocol Encryption (HAIPE) subsystem as a security layer for communications from said second plane to said first plane.

8. A method for forming a Quality of Service (QoS) hierarchical, disruption tolerant network, comprising:

using a Delay Tolerant Network (DTN) software overlay in a first plane of said network to define hierarchical forwarding behavior for data being generated by a plurality of different applications at a first node of the network, and at a first speed;

communicating information to and from said first plane using a first router;

in a second plane of the network, using a second router to communicate information from said first router to a second node at a second speed, and using the second router to perform local buffering and data retransmission in response to at least one intermittent network outage affecting said network, without causing buffering to be invoked by said first router; and using the second router to communicate signals that invoke buffering by the first router while said second router is performing said local buffering, to further assist in managing the communication of data between said first and second planes as needed to prevent a loss of said data in the event said intermittent network outage extends in duration to a point where a maximum buffering capacity of said second buffer is reached, and buffering by said first buffer becomes needed.

9. The method of claim 8, wherein said using said DTN software overlay in a first plane comprises using a DTN software overlay in a plain-text side of a cryptographically partitioned network.

10. The method of claim 9, wherein said plain-text side of said cryptographically partitioned network is designated as a red side of the network.

11. The method of claim 10, wherein said using a second router in a second plane of the network comprises using a second router in a cipher-text side of a cryptographically partitioned network.

12. The method of claim 11, wherein said using a first router comprises using a first router and a first network manager subsystem to manage communications between said first and second routers.

13. The method of claim 12, wherein said using a second router comprises using a second router and a second network manager subsystem to manage communications between said first and second routers.

14. The method of claim 13, further comprising using a guard subsystem interposed between said first and second network manager subsystems to verify that messages transmitted from said second router to said first router have been legitimately transmitted from said second router.

15. The method of claim 14, further comprising using a High Assurance Internet Protocol Encryption (HAIPE) subsystem as a security layer for communications between said first and second layers.

16. The method of claim 8, wherein said first speed is less than said second speed.

17. A Quality of Service (QoS), hierarchical, disruption tolerant network comprising:

a Delay Tolerant Network (DTN) software overlay in a first plane of the network that defines a hierarchical forwarding behavior for data being generated by a plurality of different applications, and being transmitted by a first router at a first node of the network, and at a first speed;

a second plane of the network, including a second router to communicate information from said first router to a second node at a second speed that is greater than said first speed, and using the second network to perform local buffering and data retransmission in response to at least one intermittent network outage affecting said network; and the second router configured to communicate information to the first router as needed to cause the first router to begin buffering data when a maximum buffering capacity of the second buffer is reached, to thus further manage the transmission of data from said first node to a second node as needed to prevent a loss of said data when a network outage occurs, and where the network outage is longer in duration than said at least one intermittent outage.

18. The network of claim 17, wherein said first plane comprises a plain-text side of a cryptographically partitioned network.

19. The network of claim 18, wherein said second plane comprises a cipher-text side of said cryptographically partitioned network.

20. The network of claim 18, wherein said first plane includes a first network manager subsystem for facilitating communications between said second and first routers, and said second plane includes a second network manager subsystem for facilitating communications between said second router and said first network manager subsystem.

21. The network of claim 19, further comprising a High Assurance Internet Protocol Encryption (HAIPE) subsystem adapted to function as a security layer for data transmissions between said routers.

* * * * *